US012729737B2

(12) United States Patent
Daimon

(10) Patent No.: US 12,729,737 B2
(45) Date of Patent: Sep. 8, 2026

(54) FRICTION ADJUSTING MATERIAL, FRICTION MATERIAL COMPOSITION, FRICTION MATERIAL, AND FRICTION MEMBER

(71) Applicant: OTSUKA CHEMICAL CO., LTD., Osaka-city (JP)

(72) Inventor: Emiko Daimon, Tokushima-city (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 478 days.

(21) Appl. No.: 18/019,399

(22) PCT Filed: Jul. 7, 2021

(86) PCT No.: PCT/JP2021/025562

§ 371 (c)(1),
(2) Date: Feb. 2, 2023

(87) PCT Pub. No.: WO2022/030165

PCT Pub. Date: Feb. 10, 2022

(65) Prior Publication Data

US 2023/0204083 A1 Jun. 29, 2023

(30) Foreign Application Priority Data

Aug. 4, 2020 (JP) ................................ 2020-132367

(51) Int. Cl.
*F16D 69/02* (2006.01)
*B60L 7/24* (2006.01)
(Continued)

(52) U.S. Cl.
CPC ......... *F16D 69/026* (2013.01); *C01G 23/005* (2013.01); *B60L 7/24* (2013.01);
(Continued)

(58) Field of Classification Search
None
See application file for complete search history.

(56) References Cited

U.S. PATENT DOCUMENTS 11,448,277 B2 9/2022 Yamamoto et al.
2008/0249222 A1 10/2008 Itoi
(Continued)

FOREIGN PATENT DOCUMENTS

CN 104341002 A 2/2015
CN 110300787 A 10/2019
(Continued)

OTHER PUBLICATIONS

Office Action dated Mar. 17, 2025, issued in counterpart CN Application No. 202180059678.5.(10 pages).
(Continued)

*Primary Examiner* — Jeffrey D Washville
(74) *Attorney, Agent, or Firm* — WHDA, LLP

(57) ABSTRACT

Provided is a friction modifier giving excellent formability in producing a friction material and capable of reducing rust formation on a rotor even when the moisture-absorbed friction material is left pressed against the rotor for a long. The friction modifier is made of a titanate compound having a tunnel crystal structure, wherein the titanate compound has a rate of chlorine ion dissolution of 0.5 ppm to 400 ppm.

13 Claims, 1 Drawing Sheet

(51) Int. Cl.

| | |
|---|---|
| ***C01G 23/00*** | (2006.01) |
| ***F16D 65/02*** | (2006.01) |
| ***F16D 65/12*** | (2006.01) |

(52) U.S. Cl.

CPC ...... *C01P 2002/50* (2013.01); *C01P 2004/20* (2013.01); *C01P 2004/61* (2013.01); *C01P 2004/62* (2013.01); *C01P 2006/12* (2013.01); *F16D 65/127* (2013.01); *F16D 2065/1324* (2013.01); *F16D 2200/0043* (2013.01)

(56) References Cited

U.S. PATENT DOCUMENTS

| | | | | |
|---|---|---|---|---|
| 2011/0158898 | A1 | 6/2011 | Itoi | |
| 2015/0287753 | A1 | 10/2015 | Sugai et al. | |
| 2016/0221882 | A1 | 8/2016 | Muroya et al. | |
| 2020/0002184 | A1* | 1/2020 | Kamada .................. | F16D 69/02 |

FOREIGN PATENT DOCUMENTS

| | | | |
|---|---|---|---|
| CN | 110345183 | A | 10/2019 |
| EP | 2980155 | A1 | 2/2016 |
| EP | 3594309 | A1 | 1/2020 |
| GB | 2305433 | A | 4/1997 |
| JP | 858-121325 | A | 7/1983 |
| JP | 861-276827 | A | 12/1986 |
| JP | 09-078055 | A | 3/1997 |
| JP | 2003073436 | A | 3/2003 |
| JP | 2014-122314 | A | 7/2014 |
| JP | 2015-59143 | A | 3/2015 |
| JP | 2015-147913 | A | 8/2015 |
| JP | 2016222817 | A | 12/2016 |
| JP | 2017-2185 | A | 1/2017 |
| JP | 2017-25286 | A | 2/2017 |
| JP | 2020-94115 | A | 6/2020 |
| WO | 2008123046 | A1 | 10/2008 |

OTHER PUBLICATIONS

Zhu, Y. et al., Material Chemistry, North Western Polytechnical University Press, p. 328, 2018, with English translation.(7 pages); cited in CN Office Action dated Mar. 17, 2025.

Notice of Opposition mailed on Sep. 26, 2022, issued in counterpart JP Patent No. 7016996 with English translation. (50 pages).

Test Report, SGS Testing & Control Services Singapore Pte Ltd,, Aug. 17, 2017, with English translation. (6 pages) cited in Notice of Opposition mail dated Sep. 26, 2022.

Office Action dated Feb. 1, 2008, issued in counterpart JP Application No. 2003-180382, with English translation (6 pages); cited in Notice of Opposition mail dated Sep. 26, 2022.

Shinichi Murayama; Plastic Materials Course [15] Phenolic Resin, fifth edition, May 20, 1979, Nikkan Kogyo Shimbun, Ltd., p. 104 with English translation; cited in Notice of Opposition mail dated Sep. 26, 2022.

International Search Report dated Oct. 12, 2021, issued in counterpart application No. PCT/JP2021/025562. (2 pages).

Notification of Transmittal of Translation of the International Preliminary Report on Patentability (Form PCT/ B/338) mailed on Feb. 16, 2023, issued in counterpart International Application No. PCT/JP2021/025562, with Forms PCT/IB/373 and PCT/ISA/237 (5 pages, w/ English translation).

Office Action dated Jun. 17, 2024, issued in counterpart CN Application No. 202180059678.5. (9 pages).

Notification of Transmittal of Translation of the International Preliminary Report on Patentability (Form PCT/IB/338) mailed on Feb. 16, 2023, issued in counterpart International Application No. PCT/JP2021/025561, with Forms PCT/IB/373 and PCT/ISA/237 (5 pages, w/ English translation).

Extended Supplementary European Search Report dated Jul. 25, 2024, issued in counterpart Application No. 21853734.8. (6 pages).

Office Action dated Dec. 29, 2025, issued in counterpart IN Application No. 202317008554. (7 pages).

Office Action dated Jul. 24, 2026, issued in counterpart IN Application No. 202317008554, with English translation. (3 pages).

* cited by examiner

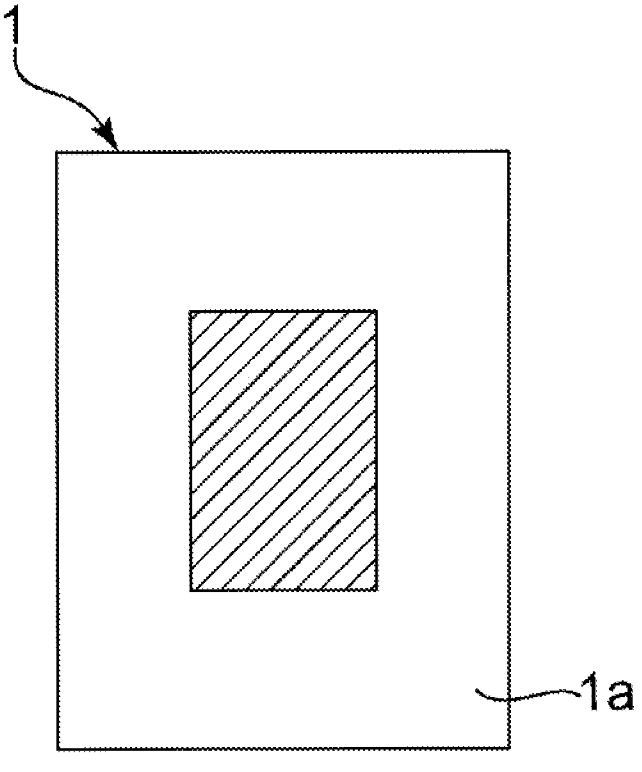
1
1a

FRICTION ADJUSTING MATERIAL, FRICTION MATERIAL COMPOSITION, FRICTION MATERIAL, AND FRICTION MEMBER

TECHNICAL FIELD

The present invention relates to friction modifiers and friction material compositions, friction materials, and friction members each using the friction modifiers.

BACKGROUND ART

Friction materials for use in brakes, such as disc brakes or drum brakes, constituting parts of braking devices for various types of vehicles, industrial machines, and so on are required to have a high and stable coefficient of friction, excellent wear resistance, and low aggressiveness toward counter-members. These friction materials are classified into three types: a semimetallic material containing steel-based fibers as a fibrous base material in an amount of not less than 30% by mass and less than 60% by mass relative to the total amount of a friction material composition; a low-steel material containing steel-based fibers as a part of a fibrous base material in an amount of not less than 10% by mass and less than 30% by mass relative to the total amount of a friction material composition; and a NAO (non-asbestos-organic) material substantially free of steel-based fibers, such as steel fibers or stainless steel fibers, as a fibrous base material.

NAO materials are predominantly used as friction materials in Japan and the U.S.A. because of their low aggressiveness toward counter-members (rotors) and good balance between squealing and wear resistance. In Europe, low-steel materials have heretofore been used from the perspective of holding the coefficient of friction during braking from high speed, but NAO materials causing less brake squeal are increasingly used with the growing need for higher quality products.

Compositions used in NAO materials (hereinafter, referred to also as "friction material compositions") generally contain copper fibers or copper powder. This is because it is believed that at friction between a friction material and a counter-member, copper forms, due to its ductility, an adhering film (hereinafter, referred to also as a "transfer film") on the surface of the counter-member and the adhering film acts as a protective film to enable the friction material to hold a high coefficient of friction at high temperatures. However, in relation to copper-containing friction materials, abrasion powder produced from the friction materials during braking contains copper and, therefore, it is suggested that the abrasion powder may be a source of river, lake, and ocean pollutions. For this reason, in California and Washington, U.S.A., state laws have come into effect to forbid the sale and assembly into new cars of friction materials containing 5% by mass or more copper in 2021 and beyond or 0.5% by mass or more copper in 2025 and beyond. In view of these circumstances, there is an urgent need to develop a friction material free of copper or containing less copper.

Attention is currently focused on titanates, such as potassium titanate, potassium lithium titanate, and potassium magnesium titanate, as components assuming the role of a transfer film except for copper. For example, there are proposed a friction material composition containing potassium titanate formed of particles of a shape with multiple projections, an abrasive material, and an elastomer-modified phenolic resin (Patent Literature 1), a friction material composition containing two or more types of titanate compounds and ceramic fibers (Patent Literature 2), and a friction material composition containing a titanate compound having a tunnel crystal structure and a titanate compound having a layered crystal structure (Patent Literature 3).

With recent hybridization and electrification of automobiles, regenerative braking systems are in increasingly widespread use. Regenerative braking systems use, as braking forces, not only conventional frictional resistance of the friction material, but also resistance produced in converting a rotational force of the tire to electric power. In the friction material of an automobile with such a regenerative braking system, the load due to friction is reduced, which makes it difficult to rub off rust on the rotor by braking. Furthermore, when copper is excluded from the compounding ingredients of the friction material, the rust removing effect is reduced, which makes the rust problem worse.

If, in a disc brake with a parking mechanism, the friction material is left pressed against the rotor for a long time, for example, the parking brake is left on for a long time, the rotor and the friction material may cause sticking due to rust (hereinafter, referred to also as "rust sticking"). As a technique for reducing rust formation leading to rust sticking, there is known a technique of blending a pH adjuster, such as an alkali metal salt or an alkaline earth metal salt, into a friction material (Patent Literature 4).

CITATION LIST

Patent Literature

Patent Literature 1: JP-A-2014-122314
Patent Literature 2: JP-A-2015-059143
Patent Literature 3: JP-A-2015-147913
Patent Literature 4: JP-A-2017-025286

SUMMARY OF INVENTION

Technical Problem

The conventional technique for reducing rust formation has a tendency to improve the reduction of rust formation on the rotor, but has a problem of poor formability of the friction material due to inhibition of curing of the thermosetting resin.

An object of the present invention is to provide a friction modifier giving excellent formability in producing a friction material and capable of reducing rust formation on a rotor even when the moisture-absorbed friction material is left pressed against the rotor for a long time, and a friction material composition, a friction material, and a friction member each using the friction modifier.

Solution to Problem

The present invention provides the following friction modifier and the following friction material composition, friction material, and friction member using the friction modifier.

Aspect 1: A friction modifier made of a titanate compound having a tunnel crystal structure, the titanate compound having a rate of chlorine ion dissolution of 0.5 ppm to 400 ppm.

Aspect 2: The friction modifier according to aspect 1, wherein the titanate compound is at least one selected from the group consisting of: $A_2Ti_nO_{(2n+1)}$ [where A is at least one of alkali metals except for Li and n is a number from 2 to 11]; and $A_{(2+y)}Ti_{(6-x)}M_xO_{(13+y/2-(4-z)x/2)}$ [where A is at least, one of alkali metals except for Li, M is at least one selected from among Li, Mg, Zn, Ga, Ni, Cu, Fe, Al, and Mn, z represents a valence of element M and is an integer from 1 to 3, 0.05≤x≤0.5, and 0≤y≤(4−z)x].

Aspect 3: The friction modifier according to aspect 1 or 2, wherein the titanate compound is formed of particles of a shape with multiple projections, platy particles, bar-like particles or spherical particles.

Aspect 4: The friction modifier according to any one of aspects 1 to 3, wherein the titanate compound has a rate of alkali metal ion dissolution of 0.01% by mass to 15% by mass.

Aspect 5: The friction modifier according to any one of aspects 1 to 4, wherein the titanate compound has an average particle diameter of 0.1 μm to 200 μm.

Aspect 6: The friction modifier according to any one of aspects 1 to 5, wherein the titanate compound has a specific surface area of 0.1 $m^2/g$ to 12 $m^2/g$.

Aspect 7: A friction material composition containing the friction modifier according to any one of aspects 1 to 6 and a thermosetting resin, wherein a content of copper component in a total amount of 100% by mass of the friction material composition is less than 0.5% by mass in terms of copper element.

Aspect 3: The friction material composition according to aspect 7, wherein a content of the friction modifier is 1% by mass to 40% by mass in the total amount of 100% by mass of the friction material composition.

Aspect 9: The friction material composition according to aspect 7 or 8, wherein a mass ratio of the friction modifier to the thermosetting resin (friction modifier to thermosetting resin) is 0.1 to 8.

Aspect 10: The friction material composition according to any one of aspects 7 to 9, being substantially free of fibers of any metal different from copper or copper alloy.

Aspect 11: The friction material composition according to any one of aspects 7 to 10, being a friction material composition for a regenerative braking system.

Aspect 12: A friction material being a formed body of the friction material composition according to any one of aspects 7 to 11.

Aspect 13: A friction member including the friction material according to aspect 12.

Advantageous Effects of Invention

The present invention enables provision of a friction modifier giving excellent formability in producing a friction material and capable of reducing rust formation on a rotor even when the moisture-absorbed friction material is left pressed against the rotor for a long time, and a friction material composition, a friction material, and a friction member each using the friction modifier.

BRIEF DESCRIPTION OF DRAWINGS

FIG. 1 is a schematic view for illustrating a method for measuring the amount of rust formed on a rotor in Examples and Comparative Examples.

DESCRIPTION OF EMBODIMENTS

Hereinafter, a description will be given of an example of a preferred embodiment for working of the present invention. However, the following embodiment is simply illustrative. The present invention is not at all limited by the following embodiment.

<Friction Modifier>

A friction modifier according to the present invention is made of a titanate compound having a tunnel crystal structure, wherein the titanate compound has a rate of chlorine ion dissolution of 0.5 ppm to 400 ppm.

The term rate of chlorine ion dissolution herein refers to the percentage by mass of chlorine ions dissolved from a measurement sample of a titanate compound or others in water at 25° C. into the water. A specific measurement method of the rate of chlorine ion dissolution will be explained in Examples to be described later.

Since in the present invention the titanate compound having a tunnel crystal structure and having a rate of chlorine ion dissolution in the above range is used as the friction modifier, rust formation on a rotor can be reduced and the formability in producing a friction material can be increased.

The conventional technique for reducing rust formation has a tendency to improve the reduction of rust formation on the rotor, but has a problem of poor formability of the friction material due to inhibition of curing of the thermosetting resin.

As a solution to the above problem, the inventors focused on the rate of chlorine ion dissolution in a titanate compound having a tunnel crystal structure and found that limitation of the rate of chlorine ion dissolution within a specific range enables improvement in both the reduction of rust formation on a rotor and the formability in producing a friction material.

In the present invention, the rate of chlorine ion dissolution of the titanate compound is preferably not less than 0.5 ppm, more preferably not less than 0.3 ppm, still more preferably not less than 1 ppm, preferably not more than 400 ppm, more preferably not more than 350 ppm, and still more preferably not more than 300 ppm. When the rate of chlorine ion dissolution of the titanate compound is not less than the above lower limit and not more than the above upper limit, the formability in producing a friction material can be further increased. In addition, when the rate of chlorine ion dissolution of the titanate compound is not more than the above upper limit, rust formation on a rotor can be further reduced.

Examples of the titanate compound having a tunnel crystal structure include: $A_zTi_nO_{(2n+1)}$ [where A is at least one of alkali metals except for Li and n is a number from 2 to 11]; and $A_{(2+y)}Ti_{(6-x)}M_xO_{(13+y/2-(4-z)x/2)}$ [where A is at least one of alkali metals except for Li, M is at least one selected from among Li, Mg, Zn, Ga, Ni, Cu, Fe, Al, and Mn, z represents a valence of element M and is an integer from 1 to 3, 0.05≤x≤0.5, and 0≤y≤(4−z)x], and the titanate compound having a tunnel crystal structure is preferably at least one selected from the group consisting of: $A_2Ti_nO_{(2n+1)}$ [where A is at least one of alkali metals except for Li and n is a number from 2 to 11]; and $A_{(2+y)}Ti_{(6-x)}M_xO_{(13+y/2-(4-z)x/2)}$ [where A is at least one of alkali metals except for Li, M is at least one selected from among Li, Mg, Zn, Ga, Ni, Cu, Fe, Al, and Mn, z represents a valence of element M and is an integer from 1 to 3, 0.05≤x≤0.5, and 0≤y≤(4−z)x], more preferably $A_2Ti_nO_{(2n+1)}$ [where A is at least one of alkali metals except for Li and n is a number from 2 to 11], still more preferably $A_2Ti_nO_{(2n+1)}$ [where A is at least one of alkali metals except for Li and n is a number from 4 to 9], and particularly preferably at least one of $K_2Ti_nO_{(2n+1)}$ [where n is a number from 4 to 9] and $Na_2Ti_nO_{(2n+1)}$ [where n is a number from 4 to 8].

Specific examples of the titanate compound having a tunnel crystal structure include $K_2Ti_{4.8}O_{10.6}$ (potassium 4.8-titanate), $K_2Ti_6O_{13}$ (potassium hexatitanate), $K_2Ti_{6.1}O_{13.2}$ (potassium 6.1-titanate), $K_2Ti_{7.9}O_{16.8}$ (potassium 7.9-titanate), $K_2Ti_8O_{17}$ (potassium octatitanate), $K_2Ti_{10.9}O_{22.8}$ (potassium 10.9-titanate), $Na_2Ti_6O_{13}$ (sodiumhexatitanate), $Na_2Ti_8O_{17}$ (sodium octatitanate), $K_{2.15}Ti_{5.85}Al_{0.15}O_{13.0}$ (potassium aluminum titanate), $K_{2.20}Ti_{5.60}Al_{0.49}O_{12.9}$ (potassium aluminum titanate), and $K_{2.21}Ti_{5.90}Li_{0.10}O_{12.9}$ (potassium lithium titanate).

The titanate compound is preferably formed of non-fibrous particles from the viewpoint of working environment. Examples of the non-fibrous particles include spherical particles (inclusive of particles of a spherical shape with some asperities on its surface and particles of an approximately spherical shape, such as those having an elliptic cross-section), bar-like particles (inclusive of particles of an approximately bar-like shape as a whole, such as rodlike, columnar, prismoidal, reed-shaped, approximately columnar, and approximately reed-shaped particles), platy particles, blocky particles, particles of a shape with multiple projections (such as amoeboid, boomerang-like, cross, and kompeito-like), and particles of an irregular shape. Among them, particles of a shape with multiple projections, platy particles, bar-like particles or spherical particles are preferred, and platy particles are more preferred. Furthermore, the titanate compound may be formed of porous particles. These various types of particle shapes can be arbitrarily controlled depending on production conditions, particularly, the composition of raw materials, firing conditions, and so on. The particle shapes can be analyzed, for example, by observation with a scanning electron microscope (SEM).

The term "non-fibrous particles" herein refers to particles in which L/B is 5 or less where L represents a length which is the longest side of, among cuboids (circumscribing cuboids) circumscribing the particle, a cuboid having the minimum volume, B represents a breadth which is the second longest side of the cuboid, and T represents a thickness which is the shortest side of the cuboid (provided, however, that B>T). The term "with multiple projections" herein means that the shape of particles projected onto a plane is different at least from a normal polygon, circle, ellipse, and so on, and the particles can take on a shape having projections in two or more directions. More specifically, the projections correspond to portions projecting from a polygon, circle, ellipse or the like (i.e., a basic shape) applied to a photograph (projected figure) captured by a scanning electron microscope (SEM).

The average particle diameter of the titanate compound is preferably 0.1 μm to 200 μm, more preferably 1 μm to 100 μm, and still more preferably 3 μm to 20 μm. When the average particle diameter is in the above range, the frictional properties of a friction material can foe further increased.

The average particle diameter herein refers to a particle diameter at a volume-based cumulative value of 50% in a particle size distribution measured by the laser diffraction method. This average particle diameter $D_{50}$ is a particle diameter at a cumulative value of 50% in a cumulative curve of a particle size distribution determined on a volume basis, the cumulative curve assuming the total volume of particles to be 100%, where during accumulation the number of particles is counted from a smaller size side.

The specific surface area of the titanate compound is preferably 0.1 $m^2/g$ to 12 $m^2/g$, more preferably 0.1 $m^2/g$ to 10 $m^2/g$, still more preferably 0.5 $m^2/g$ to 8 $m^2/g$, and particularly preferably 1 $m^2/g$ to 5 $m^2/g$. The specific surface area can be measured in conformity with JIS Z8830.

In the present invention, the rate of alkali metal ion dissolution of the titanate compound is preferably 0.01% by mass to 15% by mass, more preferably 0.05% by mass to 10% by mass, and still more preferably 0.1% by mass to 6% by mass.

In a curing reaction of a novolac-type phenolic resin as an example of a thermosetting resin for use in the friction material composition, a curing accelerator, for example, hexamethylenetetramine, opens its ring and binds to a hydroxyl group in the novolac-type phenolic resin, thus initiating the curing reaction. However, if in doing so alkali metal ions exist, it can be assumed that the alkali metal ions undergo an ion-exchange reaction with hydrogen ions in hydroxyl groups of the novolac-type phenolic resin to inhibit the binding of hexamethylenetetramine (curing accelerator) to the novolac-type phenolic resin (thermosetting resin) (cause curing inhibition).

Therefore, by defining the rate of alkali metal ion dissolution in the above range, inhibition of curing of the thermosetting resin during shape forming by the application of heat and pressure can be prevented and, as a result, the crack resistance at high temperature and high load can be further increased.

The term rate of alkali metal ion dissolution herein refers to the percentage by mass of alkali metal ions dissolved from a measurement sample of a titanate compound or others in water at 80° C. into the water.

Also when chlorine ions are excessively present inside the crystals or on the particle surfaces of the titanate compound, the curing of the thermosetting resin is inhibited during shape forming by the application of heat and pressure in producing a friction material, which deteriorates the formability. It can be presumed from this that chlorine ions present inside the crystals or on the particle surfaces of the titanate compound are involved in the rate of dissolution of an alkali metal from the titanate compound.

Regarding the titanate compound, treated layers made of a surface treatment agent may be formed on the surfaces of particles of the titanate compound for the purposes of further increasing the dispersibility and further increasing the adhesion to the thermosetting resin. Examples of the surface treatment agent include silane coupling agents and titanium coupling agents. Among them, silane coupling agents are preferred and aminosilane coupling agents, epoxysilane coupling agents, and alkylsilane coupling agents are more preferred. These surface treatment agents may be used alone or as a mixture of two or more thereof.

Examples of the aminosilane coupling agents include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-ethoxysilyl-N-(1,3-dimethylbutylidene)propylamine, N-phenyl-3-aminopropyltrimethoxysilane, and N-(vinylbenzyl)-2-aminoethyl-3-aminopropyltrimethoxysilane.

Examples of the epozysilane coupling agents include 3-glycidyloxypropyl(dimethoxy)methylsilane, 3-glycidyloxypropyltrimethoxysilane, diethoxy (3-glycidyloxypropyl)methylsilane, triethoxy(3-glycidyloxypropyl)silane, and 2-(3,4-epoxycyclohezyl)ethyltrimethoxysilane.

Examples of the alkylsilane coupling agents include methyltrimethoxysilane, dimethyldimethoxysilane, trimethylmethoxysilane, methyltriethoxysilane, ethyltrimethoxysilane, n-propyltrimethoxysilane, isobutyltrimethoxysilane, isobutyltriethoxysilane, n-hexyltrimethoxysilane, n-hexyltriethoxysilane, cyclohexylmethyldimethoxysilane, n-octyltriethoxysilane, and n-decyltrimethoxysilane.

Known surface treatment methods can be used as the method for forming treated layers made of a surface treatment agent on the surfaces of particles of the titanate compound and an example is a wet method of dissolving the surface treatment agent in a solvent promoting hydrolysis (for example, water, an alcohol or a mixed solvent of them) to prepare a solution and spraying the solution on the titanate compound.

There is no particular limitation as to the amount of surface treatment agent in treating the surfaces of particles of the titanate compound with the surface treatment agent, but, in the case of the wet method, the solution of the surface treatment agent may be sprayed so that the amount of surface treatment agent reaches, for example, 0.1 parts by mass to 20 parts by mass relative to 100 parts by mass of titanate compound.

The method for producing a titanate having a tunnel crystal structure is not particularly limited and an example is a production method including: Step I of preparing a titanate having a layered crystal structure; Step II of deintercalating, by acidic treatment, interlayer cations of the titanate prepared in Step I to prepare titanic acid; and Step III of immersing titanic acid prepared in Step II into an aqueous solution of an alkali metal hydroxide to intercalate alkali metal ions into titanic acid and then firing titanic acid intercalated with alkali metal ions.

An example of the titanate having a layered crystal structure prepared in Step I is $A_xM_yTi_{(2-y)}O_4$ [where A is at least one of alkali metals except for lithium (Li), M is at least one selected from among Li, Mg, Zn, Ga, Ni, Cu, Fe, Al, and Mn, x is a number from 0.5 to 1.0, and y is a number from 0.25 to 1.0]. Examples of the alkali metals except for lithium include sodium, potassium, rubidium, cesium, and francium. Among them, potassium and sodium are preferred because they are economically advantageous.

The method for producing a titanate compound having a layered crystal structure prepared in Step I is not particularly limited and, for example, the titanate compound can be obtained by firing a mixture of: titanium oxide or a compound generating titanium oxide by the application of heat (these substances may be summarized collectively as a "titanium compound"); an oxide of at least one metal selected from alkali metals except for Li (these metals may be referred to collectively as "A metals"), a compound generating an oxide of an A metal by the application of heat or a salt of an A metal (these substances may be summarized collectively as an "A metal compound"); an oxide of at least one metal selected from among Li, Mg, Zn, Ni, Cu, Fe, Al, Ga, and Mn (these metals may be referred to collectively as "M metals"), a compound generating an oxide of an M metal by the application of heat or a salt of an M metal (these substances may be summarized collectively as an M metal compound); and, as necessary, a flux.

In a conventional method for producing a titanate compound, potassium chloride, potassium fluoride, potassium molybdate, potassium tungstate or the like is used as a flux for the purpose of facilitating the specification of the crystal orientation of the titanate compound by allowing the crystals to be generated at a temperature lower than the melting point and allowing the crystals to grow and concurrently have an euhedral shape surrounded by flat crystal planes reflecting its crystal structure. In the case of using potassium chloride as a flux, from the perspective of reducing rust formation on a rotor, the amount of potassium chloride is preferably less than 30 parts by mass relative to a total amount of 100 parts by mass of the titanium compound, the A metal compound, and the M metal compound.

The mixing proportion of the raw materials (the titanium compound, the A metal compound, the M metal compound, and so on) can be appropriately controlled by the composition formula of a desired titanate.

Examples of the titanium compound that can be used include titanium lower oxides, hydrated compounds of titanium oxide, hydrates of titanium oxide, and titanium hydroxide. From the perspective of reducing rust formation on a rotor, the rate of chlorine ion dissolution of the titanium compound is preferably not more than 100 ppm and more preferably not more than 50 ppm.

Examples of the A metal compound include carbonates, hydroxides, nitrates, and sulfates of A metals and, among them, carbonates and hydroxides of A metals are preferred. Examples of the M metal compound include carbonates, hydroxides, oxides, nitrates, and sulfates of M metals and, among them, carbonates and hydroxides of M metals are preferred.

The firing in Step I is performed using an electric furnace or the like and the firing reaction can be concluded by holding the mixture therein for 1 hour to 24 hours within a temperature range of 800° C. to 1100° C., thus obtaining a powder of the titanate compound having a layered crystal structure. After the firing, the obtained powder may be ground to a desired size or de-agglomerated by passing it through a sieve.

Examples of the acid for use in the deintercalation by acidic treatment in Step II include mineral acids, such as sulfuric acid, nitric acid, and hydrochloric acid. The acidic treatment is preferably performed by stirring the titanate until the interlayer cations thereof are substantially completely eluted in an aqueous solution of such an acid listed above. The stirring time taken is normally preferably about five hours to about eight hours. The obtained titanic acid is washed with water and then used for Step III.

Step III can be performed by making titanic acid obtained in Step II into an about 1% by mass to about 30% by mass slurry and adding the alkali metal hydroxide into the slurry to give a pH of 12 to 13, followed by stirring. The stirring time taken is normally preferably about five hours to about eight hours. Example of the alkali metal hydroxide include potassium hydroxide and sodium hydroxide.

After the intercalation with alkali metal ions, the slurry is filtered, washed with water, and dried. Then, the firing reaction of titanic acid can be concluded by holding it in an electric furnace or the like for 1 hour to 14 hours within a temperature range of 500° C. to 900° C. After the firing, the obtained powder may be ground to a desired size or de-agglomerated by passing it through a sieve. In the manner described thus far, the titanate compound having a tunnel crystal structure according to the present invention can be obtained.

The rate of chlorine ion dissolution in the titanate compound having a tunnel crystal structure can be controlled by the rate of chlorine ion dissolution of a titanium compound which is a raw material, the amount of flux, the degree of washing for removing chlorine during or after the production of the titanate compound having a tunnel crystal structure, and so on.

However, as for titanate compounds having a tunnel crystal structure, chlorine in crystals is difficult to remove. When the amount of chlorine derived from the raw material is reduced and the mixture of raw materials is mechanochemically ground to increase the reaction activity and then washed with lean water, the amount of chlorine contained the obtained titanate compound can foe reduced. However, the activity of crystal terminals increases, which may make the titanate compound incompatible with the thermosetting resin and thus deteriorate the formability. The strength of the activity of the titanate compound can be evaluated according to the degree of browning of vitamin C. Specificality, the lower the degree of browning of vitamin C is, the lower the activity is and the more the formability can be increased.

<Friction Material Composition>

A friction material composition according to the present invention contains the above-described friction modifier according to the present invention and a thermosetting resin, wherein the content of copper component in a total amount of 100% by mass of the friction material composition is less than 0.5% by mass in terms of copper element. As necessary, the friction material composition may further contain other materials. The term "friction material composition" herein refers to a composition for use in a friction material.

When the friction material composition contains less than 0.5% by mass copper component in terms of copper element in a total amount of 100% by mass of the friction material composition or is preferably free of copper component, the friction material composition can be environmentally friendly as compared to conventional friction material compositions. The term "free of copper component" herein means that the friction material composition contains as raw and processed material none of copper fibers, copper powder, a copper-containing alloy (such as brass or bronze), and a copper compound.

Although being free of copper component or having a small content of copper component, the friction material composition according to the present invention when used in a friction material has a high coefficient of friction and can give excellent v/ear resistance to the friction material. In addition, since the friction material composition contains the above-described friction modifier, it can reduce rust formation on a rotor and give an excellent formability of a friction material.

Furthermore, from the viewpoint of low aggressiveness toward counter-members (rotors) and a balance between squealing and wear resistance, the friction material composition according to the present invention is preferably also substantially free of fibers of any metal different from copper and copper alloy, and more preferably free of fibers of any metal different from copper and copper alloy. The term "substantially free of" herein means that the content of the component is less than 0.5% by mass in a total amount of 100% by mass of the friction material composition.

(Friction Modifier)

A friction modifier for use in the friction material composition according to the present invention is the above-described friction modifier according to the present invention. The content of the friction modifier according to the present invention in the friction material composition is, relative to a total amount of 100% by mass of the friction material composition, preferably 1% by mass to 40% by mass, more preferably 5% by mass to 35% by mass, and still more preferably 10% by mass to 30% by mass. By defining the content of the friction modifier according to the present invention within the above range, the friction material composition can achieve more excellent frictional properties. In addition, rust formation on a rotor can be further reduced and the formability of a friction material can foe further increased.

(Thermosetting Resin)

A thermosetting resin is used as a binder capable of being integrated with the titanate compound to give strength. Therefore, the thermosetting resin that can be used is an arbitrary one appropriately selected from among known thermosetting resins for use as binders.

Examples of the thermosetting resin include: phenolic resins; elastomer-dispersed phenolic resins, such as acrylic elastomer-dispersed phenolic resins and silicone elastomer-dispersed phenolic resins; modified phenolic resins, such as acrylic-modified phenolic resins, silicone-modified phenolic resins, cashew-modified phenolic resin, epoxy-modified phenolic resin, and alkyl benzene-modified phenolic resin; formaldehyde resins; melamine resins; epoxy resins; acrylic resins; aromatic polyester resins; and urea resins. These resins can be used singly or in combination of two or more thereof. Among them, phenolic resins (straight phenolic resins) and modified phenolic resins are preferred because they enable further improvement in thermal resistance, formability, and frictional properties.

The content of the thermosetting resin in the friction material composition is preferably 5% by mass to 20% by mass relative to a total amount of 100% by mass of the friction material composition. By defining the content of the thermosetting resin within the above range, spaces between the mixed materials are filled with a suitable amount of binder, which enables the friction material composition to achieve more excellent frictional properties.

The mass ratio of the friction modifier to the thermosetting resin (friction modifier to thermosetting resin) is preferably not less than 0.1, more preferably not less than 0.5, still more preferably not less than 1, preferably not more than 8, more preferably not more than 6, and still more preferably not more than 4. By defining the mass ratio of the friction modifier to the thermosetting resin within the above range, the formability can be further increased.

(Other Materials)

The friction material composition according to the present invention may contain, in addition to the above-described friction modifier and thermosetting resin, other materials as necessary. Examples of the other materials include a fibrous base material and a friction modifier other than the friction modifier according to the present invention, as will be described below.

Examples of the fibrous base material include: organic fibers, such as aromatic polyamide (aramid) fibers, fibrillated aramid fibers, acrylic fibers (homopolymeric or copolymeric fibers made mainly from acrylonitrile), fibrillated acrylic fibers, cellulose fibers, fibrillated cellulose fibers, and phenolic resin fibers; straight or curled fibers made of metal other than copper and copper alloys and containing the metal as a main component, such as fibers made of a metal alone or in an alloy form of aluminum, iron, zinc, tin, titanium, nickel, magnesium, silicon or other metals, and cast iron fibers; inorganic fibers, such as glass fibers, rock wool, ceramic fibers, biodegradable ceramic fibers, biodegradable mineral fibers, biosoluble fibers (such as $SiC_2$—CaO—SrO-based fibers), wollastonite fibers, silicate fibers, and mineral fibers; and carbon-based fibers, such as flame-resistant fibers, PAN-based carbon fibers, pitch-based carbon fibers, and activated carbon fibers. These various kinds of fibers may be used singly or in combination of two or more thereof.

Examples of the friction modifier other than the friction modifier according to the present invention include: unvulcanized or vulcanized rubber powders, such as tire rubber, acrylic rubber, isoprene rubber, NBR (nitrile-butadiene rubber), SBP. (styrene-butadiene rubber), chlorinated butyl rubber, butyl rubber, and silicone rubber; organic fillers, such as cashew dust, melamine dust, and rubber-coated cashew dust; inorganic powders, such as barium sulfate, calcium carbonate, sodium carbonate, lithium carbonate, calcium hydroxide (hydrated lime), vermiculite, clay, mica, talc, dolomite, chromite, mullite, potassium lithium titanate with a layered crystal structure, and potassium magnesium titanate with a layered crystal structure; inorganic fillers, such as metal powders other than copper and copper alloys, made of a metal alone or in an alloy form of aluminum, zinc, iron, tin or other metals; abrasive materials, such as silicon carbide, titanium oxide, alumina (aluminum oxide), silica (silicon dioxide), magnesia (magnesium oxide), zirconia (zirconium oxide), zirconium silicate, chromium oxide, iron oxide (such as triiron tetroxide), chromite, and quartz; and solid lubricants, such as synthetic or natural graphite, phosphate-coated graphite, carbon black, coke, antimony trisulfide, molybdenum disulfide, tin sulfide, iron sulfide, zinc sulfide, bismuth sulfide, tungsten disulfide, and polytetrafluoroethylene (PTEF). These friction modifiers can be used singly or in combination of two or more thereof.

The content of the other materials in the friction material composition is preferably 40% by mass to 94% by mass relative to a total amount of 100% by mass of the friction material composition.

(Method for Producing Friction Material Composition)

The friction material composition according to the present invention can be produced by, for example, (1) the method of mixing components with a mixer, such as a Lodige mixer ("Lodige" is a registered mark), a pressure kneader or an Eirich mixer ("Eirich" is a registered mark), or (2) the method of preparing a granulated material of desired components and, if necessary, mixing it together with other components using a mixer, such as a Lodige mixer, a pressure kneader or an Eirich mixer.

The content of each component in the friction material composition according to the present invention can be appropriately selected depending on the desired frictional properties and the friction material composition can be produced by the above-described production methods.

Alternatively, the friction material composition according to the present invention may be prepared by producing a master batch containing a particular component at a high concentration, adding a thermosetting resin and so on to the master batch, and mixing them.

<Friction Material and Friction Member>

In the present invention, a friction material having a predetermined shape can be produced by preliminarily forming the above friction, material composition at ordinary temperature (20° C.), forming the resultant preform by the application of heat and pressure (at a forming pressure of 10 MPa to 40 MPa and a forming temperature of 150° C. to 200° C.), subjecting, if necessary, the resultant formed body to heat treatment (holding it at 150° C. to 220° C. for 1 hour to 12 hours) in a furnace, and then subjecting the formed body to machining and polishing processes.

The friction material according to the present invention is used as a friction member formed so that the friction material provides a friction surface. Examples of a friction member formable using the friction material include: (1) a structure composed of the friction material alone; and (2) a structure including a substrate, such as a back metal, and the friction material according to the present invention provided on the substrate and providing a friction surface.

The substrate is used in order to further increase the mechanical strength of the friction member, wherein metal, fiber-reinforced resin or other materials can be used as the material for the substrate. Examples of the material include iron, stainless steel, glass fiber-reinforced resin, and carbon fiber-reinforced resin.

A friction material generally has a large number of microscopic pores formed inside thereof and these pores serve as escape routes for decomposition products (gas and liquid substances) at high temperatures to prevent reduction in frictional properties and concurrently reduce the stiffness of the friction material and increase the damping performance thereof, thus preventing the occurrence of squeal. In a normal friction material, the mixing and shape forming conditions of the materials are controlled so that the porosity reaches preferably 5% to 30% and more preferably 10% to 25%.

Since the friction member according to the present invention is formed of the above-described friction material composition according to the present invention, the friction member has a high coefficient of friction and excellent wear resistance although being free of copper component or having a small content of copper component. In addition, chlorine ions are less eluted, rust formation on a rotor is reduced even when the moisture-absorbed friction material is left pressed against the rotor for a long time, and the formability of the friction material is excellent. Therefore, the friction member according to the present invention can be suitably used in all braking systems for various types of vehicles, industrial machines, and so on, such as a disc pad or a brake lining each constituting part of a braking device or a clutch facing, and can be suitably used particularly as a friction member for a regenerative braking system.

EXAMPLES

The present invention will be described below in further detail with reference to specific examples.

The present invention is not at all limited by the following examples and modifications and variations may be appropriately made therein without changing the gist of the invention. Physical properties (chemical composition, rate of chlorine ion dissolution, rate of alkali metal ion dissolution, particle shape, average particle diameter, specific surface area, vitamin C browning test, and exothermic peak temperature) of the titanate compound and physical properties (rate of chlorine ion dissolution) of titanium oxide were measured in the following manners.

(Chemical Composition)

The crystal structure was confirmed with an X-ray diffraction measurement device (product number "Ultima IV" manufactured by Rigaku Corporation) and the composition formula was confirmed with an ICP-AES analyzer (product number "SPS5100" manufactured by SII Nano Technology Inc.).

(Rate of Chlorine Ion Dissolution)

The mass (X) g of a sample was measured, the sample was then added into ultrapure water to prepare a 1% by mass slurry, the slurry was stirred at 25° C. for ten minutes, and the solid content was then removed from the slurry with a membrane filter having a pore size of 0.2 μm, thus obtaining an extraction liquid. The mass (Y) g of chlorine ions in the obtained extraction liquid was measured with an ion chromatograph (product number "ICS-1100" manufactured by Dionex). Subsequently, using the values of the above masses (X) g and (Y) g, the rate of chlorine ion dissolution (ppm) was calculated based on the formula $[(Y)/(X)]\times10^6$.

(Rate of Alkali Metal Ion Dissolution)

The mass (X) g of a sample was measured, the sample was then added into ultrapure water to prepare a 1% by mass slurry, the slurry was stirred at 80° C. for four hours, and the solid content was then removed from the slurry with a membrane filter having a pore size of 0.2 μm, thus obtaining an extraction liquid. The mass (Y) g of alkali metal ions in the obtained extraction liquid was measured with an ion chromatograph (product number "ICS-1100" manufactured by Dionex). Subsequently, using the values of the above masses (X) g and (Y) g, the rate of alkali metal ion dissolution (% by mass) was calculated based on the formula [(Y)/(X)]×100.

(Particle Shape)

The particle shape was confirmed with a field-emission scanning electron microscope (product number "S-4800" manufactured by Hitachi High-Technologies Corporation).

(Average Particle Diameter)

The particle diameter was measured with a laser diffraction particle size distribution measurement device (product number "SALD-2100" manufactured by Shimadzu Corporation) and the particle diameter at a volume-based cumulative value of 50% in the obtained particle size distribution was selected as the average particle diameter.

(Specific Surface Area)

The specific surface area was measured with an automatic specific surface area measurement device (product number "Tristar II 3020" manufactured by Micromeritics Instrument Corporation).

(Vitamin C Browning Test (Δb Value))

A standard solution (emulsion) of 6.25% ascorbyl palmitate in octyl palmitate was prepared. A volume of 1.9 ml of the emulsion and 0.4 g of the titanate compound were completely mixed, a coating of the mixture was formed on a contrast ratio test sheet, and the b value (X) of the coating was measured with a colorimeter. Likewise, 1.9 ml of clean octyl palmitate and 0.4 g of the titanate compound were completely mixed, a coating of the mixture was formed on a contrast ratio test sheet, and the b value (Y) of the coating was measured with the colorimeter. Using the values (X) and (Y), a Δb value was calculated based on the formula (Y)−(X).

(Exothermic Peak Temperature)

A sample and a phenolic resin (hexamethylenetetramine-containing novolac-type phenolic resin powder) were mixed at a ratio of 75% by mass sample to 25% by mass phenolic resin and the exothermic peak temperature of the mixture under a nitrogen atmosphere v/as measured with a differential scanning calorimeter (product number "DSC6220M" manufactured by Seiko Instruments & Electronics Inc.).

Production Example 1

An amount of 542.0 g of titanium oxide (rate of chlorine ion dissolution: 20 ppm), 216.3 g of potassium carbonate, and 41.2 g of lithium carbonate were mixed by an ordinary method and the mixture of these raw materials was packed into a vibration mil and subjected to grinding processing for 30 minutes under conditions of a frequency of 1200 cpm and an amplitude of 6.0 mm. A volume of 48 ml of water was added to the ground mixture, followed by mixing, and 15 g of the ground mixture was then formed into a pellet with an oil hydraulic press at a pressure of 10 MPa. The pellet was fired at 1000° C. for four hours in an electric furnace and then slowly cooled. The obtained fired product was ground, thus obtaining a powder. The composition formula of the obtained powder was $K_{0.8}Li_{0.27}Ti_{1.73}O_4$.

The total amount of $K_{0.8}Li_{0.27}Ti_{1.73}O_4$ obtained and 297 g of 70% sulfuric acid were dispersed into a solution of them dissolved in 12 liter of water, thus obtaining a 5% by mass aqueous slurry. The aqueous slurry was kept stirred for approximately five hours by a stirring blade, then filtered, washed with water, and dried, thus obtaining titanic acid ($H_2Ti_2O_5$).

The total amount of titanic acid obtained was dispersed into a solution of 59 g of 85% potassium hydroxide dissolved in 4 liter of water, thus obtaining a 10% by mass aqueous slurry. The aqueous slurry was kept stirred for five hours by a stirring blade, then filtered, washed with water, and dried at 110° C. for two hours. Subsequently, the obtained product was fired at 500° C. for three hours in an electric furnace, thus obtaining a desired titanate compound.

The chemical composition, rate of chlorine ion dissolution, rate of alkali metal ion dissolution, particle shape, average particle diameter, specific surface area, vitamin C browning test, and exothermic peak temperature of the obtained titanate compound are shown in Table 1.

Production Example 2

A volume of 48 ml of water was added to 542.0 g of titanium oxide (rate of chlorine ion dissolution: 20 ppm), 216.8 g of potassium carbonate, 41.2 g of lithium carbonate, and 162 g of potassium chloride (20 parts by mass relative to a total amount of 100 parts by mass of other raw materials) as a flux, followed by mixing, and 15 g of the ground mixture was formed into a pellet with an oil hydraulic press at a pressure of 10 MPa. The pellet was fired at 1000° C. for four hours in an electric furnace and then slowly cooled. The obtained fired product was ground, thus obtaining a powder. The composition formula of the obtained powder was $K_{0.8}Li_{0.27}Ti_{1.73}O_4$.

The total amount of $K_{0.8}Li_{0.27}Ti_{1.73}O_4$ obtained and 297 g of 70% sulfuric acid were dispersed into a solution of them dissolved in 12 liter of water, thus obtaining a 5% by mass aqueous slurry. The aqueous slurry was kept stirred for approximately five hours by a stirring blade, then filtered, washed with water, and dried, thus obtaining titanic acid ($H_2Ti_2O_5$).

The total amount of titanic acid obtained was dispersed into a solution of 55 g of 85% potassium hydroxide dissolved in 4 liter of water, thus obtaining a 10% by mass aqueous slurry. The aqueous slurry was kept stirred for five hours by a stirring blade, then filtered, washed with water, and dried at 110° C. for two hours. Subsequently, the obtained product was fired at 500° C. for three hours in an electric furnace, thus obtaining a desired titanate compound.

The chemical composition, rate of chlorine ion dissolution, rate of alkali metal ion dissolution, particle shape, average particle diameter, specific surface area, vitamin C browning test, and exothermic peak temperature of the obtained titanate compound are shown in Table 1.

Production Example 3

An amount of 542.0 g of titanium oxide (rate of chlorine ion dissolution: 5 ppm), 216.8 g of potassium carbonate, and 41.2 g of lithium carbonate were mixed by an ordinary method and the mixture of these raw materials was packed into a vibration mil and subjected to grinding processing for 30 minutes under conditions of a frequency of 1200 cpm and an amplitude of 6.0 mm. A volume of 48 ml of water was added to the ground mixture, followed by mixing, and 15 g of the ground mixture was then formed into a pellet with an oil hydraulic press at a pressure of 10 MPa. The pellet was fired at 1000° C. for four hours in an electric furnace and then slowly cooled. The obtained fired product was ground, thus obtaining a powder. The composition formula of the obtained powder was $K_{0.8}Li_{0.27}Ti_{1.73}O_4$.

The total amount of $K_{0.8}Li_{0.27}Ti_{1.73}O_4$ obtained and 297 g of 70% sulfuric acid were dispersed into a solution of them dissolved in 12 liter of water, thus obtaining a 5% by mass aqueous slurry. The aqueous slurry was kept stirred for approximately five hours by a stirring blade, then filtered, washed with water, and dried, thus obtaining titanic acid ($H_2Ti_2O_5$).

The total amount of titanic acid obtained was dispersed into a solution of 59 g of 85% potassium hydroxide dissolved in 4 liter of water, thus obtaining a 10% by mass aqueous slurry. The aqueous slurry was kept stirred for five hours by a stirring blade, then filtered, washed with water, and dried at 110° C. for two hours. Subsequently, the obtained product was fired at 500° C. for three hours in an electric furnace, thus obtaining a desired titanate compound.

The chemical composition, rate of chlorine ion dissolution, rate of alkali metal ion dissolution, particle shape, average particle diameter, specific surface area, vitamin C browning test, and exothermic peak temperature of the obtained titanate compound are shown in Table 1.

Comparative Production Example 1

An amount of 418.94 g of titanium oxide (rate of chlorine ion dissolution: 20 ppm) and 377.05 g of potassium carbonate were mixed with a Henschel mixer and the obtained mixture was subjected to grinding processing for 45 minutes under conditions of a frequency of 1200 cpm and an amplitude of 6.0 mm.

An amount of 50 g of the ground mixture obtained in the above manner was packed into a crucible and fired at 750° C. for four hours in an electric furnace. The composition formula of the obtained product was $K_2T_2O_5$.

A volume of 500 ml of 15% by weight slurry was prepared using the obtained potassium dititanate ($K_2Ti_2O_5$) and 9.0 g of 96% by mass sulfuric acid was added to the slurry, followed by stirring for an hour to adjust the pH to 8. The solid content of the slurry was filtered out, dried, and fired at 500° C. for an hour in an electric furnace.

Furthermore, 200 ml of 15% by mass aqueous slurry of the obtained powder was prepared and dispersed in a disperse mill for 15 minutes and the aqueous slurry was then filtered by suction A process of "dispersion of a weighed-out cake (solid content) into 200 ml of pure water, dispersion of the aqueous slurry in a disperse rail, and filtration of the slurry by suction" was repeated ten times, and the obtained solid content was then dried at 110° C. for an hour, thus obtaining a powder of a desired titanate compound.

The chemical composition, rate of chlorine ion dissolution, rate of alkali metal ion dissolution, particle shape, average particle diameter, specific surface area, vitamin C browning test, and exothermic peak temperature of the obtained titanate compound are shown in Table 1.

Comparative Production Example 2

A volume of 48 ml of water was added to 542.0 g of titanium oxide (rate of chlorine ion dissolution: 20 ppm), 216.8 g of potassium carbonate, 41.2 g of lithium carbonate, and 324 g of potassium chloride (41 parts by mass relative to a total amount of 100 parts by mass of other raw materials) as a flux, followed by mixing, and 15 g of the ground mixture was formed into a pellet with an oil hydraulic press at a pressure of 10 MPa. The pellet was fired at 1000° C. for four hours in an electric furnace and then slowly cooled. The obtained fired product was ground, thus obtaining a powder. The composition formula of the obtained powder was $K_{0.8}Li_{0.27}Ti_{1.73}O_4$.

The total amount of $K_{0.8}Li_{0.27}Ti_{1.73}O_4$ obtained was dispersed into a solution of 297 g of 70% sulfuric acid dissolved in 12 liter of water, thus obtaining a 5% by mass aqueous slurry. The aqueous slurry was kept stirred for approximately five hours by a stirring blade, then filtered, washed with water, and dried, thus obtaining titanic acid ($H_2Ti_2O_5$).

The total amount of titanic acid obtained was dispersed into a solution of 59 g of 85% potassium hydroxide dissolved in 4 liter of water, thus obtaining a 10% by mass aqueous slurry. The aqueous slurry was kept stirred for five hours by a stirring blade, then filtered, washed with water, and dried at 110° C. for two hours. Subsequently, the obtained product was fired at 500° C. for three hours in an electric furnace, thus obtaining a desired titanate compound.

The chemical composition, rate of chlorine ion dissolution, rate of alkali metal ion dissolution, particle shape, average particle diameter, specific surface area, vitamin C browning test, and exothermic peak temperature of the obtained titanate compound are shown in Table 1.

TABLE 1

| | Production Ex. 1 | Production Ex. 2 | Production Ex. 3 | Comp. Production Ex. 1 | Comp. Production Ex. 2 |
|---|---|---|---|---|---|
| Chemical Composition | potassium octatitanate $K_2Ti_8O_{17}$ | potassium octatitanate $K_2Ti_8O_{17}$ | potassium octatitanate $K_2Ti_8O_{17}$ | potassium octatitanate $K_2Ti_8O_{17}$ | potassium octatitanate $K_2Ti_8O_{17}$ |
| Rate of Chlorine Ion Dissolution (ppm) | 8.1 | 255.4 | 1.5 | 0.1 | 425.3 |
| Rate of Alkali Metal Ion Dissolution (% by mass) | 0.5 | 0.5 | 0.5 | 0.7 | 0.5 |
| Particle Shape | platy | platy | platy | irregular | platy |
| Average Particle Diameter (μm) | 6 | 6 | 6 | 6 | 6 |
| Specific Surface Area ($m^2/g$) | 3.2 | 2.5 | 3.0 | 20.3 | 2.1 |
| Vitamin C Browning Test/Δb value | 11 | 13 | 12 | 43 | 8 |

TABLE 1-continued

| | Production Ex. 1 | Production Ex. 2 | Production Ex. 3 | Comp. Production Ex. 1 | Comp. Production Ex. 2 |
|---|---|---|---|---|---|
| Exothermic Peak Temperature (° C.) | 159 | 160 | 159 | 162 | 161 |

Examples 1 to 3 and Comparative Examples 1 to 2

<Production of Friction Member>

Materials were compounded at each compounding ratio described in Table 2 and mixed for three minutes with an Eirich mixer. A pressure of 15 MPa was applied to the obtained mixture at ordinary temperature (20° C.) for five seconds, thus preparing a preform. The preform was inserted into a cavity of a hot forming die heated to 150° C. and a pressure of 15 MPa to 40 MPa was applied for 300 seconds to the preform with a back plate (material: steel) placed thereon so that the porosity of the resultant formed body reached 15%. A degassing process was performed five times between after 60 seconds and after 90 seconds counted from the start of the application of pressure. The obtained formed body was put into a thermostatic oven heated to 220° C. and held for two hours therein to completely cure it, thus obtaining a friction member.

In Table 2, "Phenolic resin" is hexamethylene tetramine-containing novolac-type phenolic resin powder, "Zirconium oxide" is zirconium oxide having an average particle diameter of 5 μm, "Barium sulfate" is barium sulfate having an average particle diameter of 1.6 μm ("barium sulfate BMH-100" manufactured by Sakai Chemical Industry), and "Rockwool" is rock-wool having an average fiber length of 125 μm. Together with them. Table 2 shows the content of copper in terms of copper element, and the mass ratio of the friction modifier (titanate compound) to the thermosetting resin (phenolic resin) (i.e., titanate compound to phenolic resin).

<Evaluations of Friction Member>

The porosity, Rockwell hardness, and amount of rust formation on a rotor for each of the friction members produced in the above manners were evaluated in the following manners. The results are described in Table 2. As for the friction member in Comparative Example 1, the amount of rust formation on a rotor could not be evaluated because cracks were produced during shape forming.

(Porosity)

An object obtained by taking off the back plate from each of the friction members was used as a measurement sample and its porosity was measured in conformity with the method defined in JIS D4413.

(Rockwell Hardness)

The Rockwell hardness of the surface of each friction member was measured in conformity with the method defined in JIS D4421. S scale was used as a scale for hardness.

(Amount of Rust Formation on Rotor)

An object obtained by taking off the back plate from each friction member was cut into a test specimen with 15 mm×20 mm×9 mm thick, the test specimen was then immersed into 20 ml of deionized water for an hour, and a rotor specimen obtained by previously cutting a rotor into 15 mm×20 mm was then laid on top of the test specimen to form a sample pair. The sample pair was allowed to stand for 72 hours with a pressure of 2.0 MPa applied thereto in an environment of 25° C. and a humidity of 50%. After the test, as shown in FIG. 1, the area of a rust portion of a surface 1*a* of the rotor specimen 1 having been in contact with the pad test specimen (i.e., a portion shown by the hatched lines in FIG. 1) was determined based on the following indices.

- A: The area of a rust portion of the specimen was less than 5%.
- B: The area of a rust portion of the specimen was not less than 5% and less than 30%.
- C: The area of a rust portion of the specimen was 30% or more.

TABLE 2

| | | | Ex. 1 | Ex. 2 | Ex. 3 | Comp. Ex. 1 | Comp. Ex. 2 |
|---|---|---|---|---|---|---|---|
| Composition (% by mass) | Phenolic resin | | 94 | 9.1 | 9.1 | 9.1 | 9.1 |
| | Titanate compound | Production Ex. 1 | 17.9 | | | | |
| | | Production Ex. 2 | | 17.9 | | | |
| | | Production Ex. 3 | | | 17.9 | | |
| | | Comp. Production Ex. 1 | | | | 17.9 | |
| | | Comp. Production Ex. 2 | | | | | 17.9 |
| | Barium sulfate | | 30.2 | 30.2 | 30.2 | 30.2 | 30.2 |
| | Mica | | 4.9 | 4.9 | 4.9 | 4.9 | 4.9 |
| | Cashew dust | | 5 3 | 5.3 | 5.3 | 5.3 | 5.3 |
| | Iron oxide | | 9.0 | 9.0 | 9.0 | 9.0 | 9.0 |
| | Zirconium oxide | | 10.2 | 10.2 | 10.2 | 10.2 | 10.2 |
| | Tin sulfide | | 1.8 | 1.8 | 1.8 | 1.8 | 1.8 |
| | Graphite | | 1.5 | 1.5 | 1.5 | 1.5 | 1.5 |
| | Aramid fibers | | 2.5 | 2.5 | 2.5 | 2.5 | 2.5 |
| | Hydrated lime | | 1.5 | 1.5 | 1.5 | 1.5 | 1.5 |
| | Rock wool | | 6.0 | 6.0 | 6.0 | 6.0 | 6.0 |
| Copper content in terms of copper element (% by mass) | | | 0 | 0 | 0 | 0 | 0 |
| Mass ratio of titanate compound to phenolic resin (titanate compound to phenolic resin) | | | 2.0 | 2.0 | 2.0 | 2.0 | 3.0 |
| Evaluations | Porosity of friction member (%) | | 15 | 15 | 15 | 15 | 15 |
| | Rockwell hardness of friction member | | 75 | 75 | 75 | 55 | 72 |
| | Rust formation on rotor | | A | A | A | — | B |

Table 2 shows that, as for the friction members in Examples 1 to 3 in which a titanate compound having a small rate of chlorine ion dissolution was used, rust was less formed on the rotor.

Table 2 also shows that, as for the friction members in Examples 1 to 3 in each of which a titanate compound having a rate of chlorine ion dissolution controlled in a specific range was used, they had a porosity equal to, but a greater Rockwell hardness than the friction members in Comparative Examples 1 to 2, and, therefore, the curing reaction of the thermosetting resin was less inhibited. This enables the shape forming conditions of the friction member to be provided with wider ranges, such as a shorter forming time or a lower forming temperature, which shows that the friction members in Examples 1 to 3 have excellent formability. In addition, since the curing reaction of the thermosetting resin was less inhibited, the wear resistance of these friction members can be expected to be increased.

In relation to the friction member in Example 1 produced as above, the surface of the friction member was polished 1.0 mm and the friction member was then subjected to a braking efficacy test based on JASO C406 to determine its average coefficient of friction, amount of wear of pad (amount of wear of friction material), and amount of wear of rotor (amount of wear of counter-member). A cast-iron rotor belonging to type A in the ASTM standard was used as the rotor.

Furthermore, in relation to the friction member in Example 1 produced as above, the surface of the friction member was polished 1.0 iron and the amount of wear dust of the friction member was measured with a scale dynamometer provided with a wear dust collecting device. The wear dust collecting device was fitted with an MCI sampler (provided with a filter capable of trapping PM 10-2.5 and PM 2.5) manufactured by Tokyo Dylec Corp. and a CPC 3772 (a PM counter) manufactured by TSI. A wear dust measurement test was conducted twice under the frictional conditions shown in Table 3 using a friction member and a rotor (cast-iron rotor belonging to type A in the ASTM standard) previously rubbed together under braking conditions of 500 times at 65 km/h and 3.5 $m/s^2$, the mass of each of particulate matters (PM 10-2.5 and PM 2.5) was calculated as an average value of the amounts of the particle matter collected by the filter, and the PN (particle number) was calculated as an average value of total number concentrations.

TABLE 3

| Item | Initial Braking Speed (km/h) | Braking Deceleration ($m/s^2$) | Number of Brakings [times] | Number of Repetitions |
|---|---|---|---|---|
| Town Mode | 15 | 1.0 | 4 | 10 |
| | 35 | 1.0 | 4 | |
| | 50 | 1.0 | 4 | |
| High-Speed Mode | 35 | 1.0 | 1 | |
| | 70 | 1.0 | | |
| | 120 | 1.0 | | |

The average coefficient of friction of the friction member in Example 1 was 0.40, the amount of wear of the pad thereof was 0.40 mm, and the amount of wear of the rotor was 0.13 g. As for wear dust from the friction member in Example 1, the amount of PM 10-2.5 was 383 μg, the amount of PM 2.5 was 189 μg, and the PN was U.S. Pat. No. 1,035,772 per $cm^3$. From these results, it was confirmed that, by containing the friction modifier (titanate compound) according to the present invention, the friction member was stable at a high coefficient of friction and excellent in v/ear resistance and the production of very fine wear dust was reduced.

REFERENCE SIGNS LIST

1 . . . rotor specimen
**1*a*** . . . surface

The invention claimed is:

1. A friction modifier made of a titanate compound having a tunnel crystal structure, the titanate compound having a rate of chlorine ion dissolution of 1 ppm to 300 ppm.

2. The friction modifier according to claim 1, wherein the titanate compound is at least one selected from the group consisting of: $A_2Ti_nO_{(2n+1)}$ [where A is at least one of alkali metals except for Li and n is a number from 2 to 11]; and $A_{(2+y)}Ti_{(6-x)}M_xO_{(13+y/2-(4-z)x/2)}$ [where A is at least one of alkali metals except for Li, M is at least one selected from among Li, Mg, Zn, Ga, Ni, Cu, Fe, Al, and Mn, z represents a valence of element M and is an integer from 1 to 3, $0.05 \leq x \leq 0.5$, and $0 \leq y \leq (4-z)x$].

3. The friction modifier according to claim 1, wherein the titanate compound is formed of particles of a shape with multiple projections, platy particles, bar-like particles or spherical particles.

4. The friction modifier according to claim 1, wherein the titanate compound has a rate of alkali metal ion dissolution of 0.01% by mass to 15% by mass.

5. The friction modifier according to claim 1, wherein the titanate compound has an average particle diameter of 0.1 μm to 200 μm.

6. The friction modifier according to claim 1, wherein the titanate compound has a specific surface area of 0.1 $m^2/g$ to 12 $m^2/g$.

7. A friction material composition containing the friction modifier according to claim 1 and a thermosetting resin, wherein a content of copper component in a total amount of 100% by mass of the friction material composition is less than 0.5% by mass in terms of copper element.

8. The friction material composition according to claim 7, wherein a content of the friction modifier is 1% by mass to 40% by mass in the total amount of 100% by mass of the friction material composition.

9. The friction material composition according to claim 7, wherein a mass ratio of the friction modifier to the thermosetting resin (friction modifier to thermosetting resin) is 0.1 to 8.

10. The friction material composition according to claim 7, being substantially free of fibers of any metal different from copper or copper alloy.

11. The friction material composition according to claim 7, being a friction material composition for a regenerative braking system.

12. A friction material being a formed body of the friction material composition according to claim 7.

13. A friction member comprising the friction material according to claim 12.

* * * * *